March 6, 1934.  R. H. WHISLER  1,949,520
VIBRATION DAMPER
Filed June 16, 1931

Inventor:
Ralph H. Whisler,
By Maslin, Calver, Copeland & Dike.
Attorneys.

Patented Mar. 6, 1934

1,949,520

UNITED STATES PATENT OFFICE 1,949,520

VIBRATION DAMPER

Ralph H. Whisler, Halfway, Mich., assignor to Hudson Motor Car Company, Detroit, Mich., a corporation of Michigan Application June 16, 1931, Serial No. 544,738

2 Claims. (Cl. 74—6)

This invention relates to torsional vibration dampers of the general character of that described in the patent to Lanchester, No. 1,085,443, January 27, 1914, and more particularly to vibration dampers of the type wherein the internal friction of a resilient body or element (as distinguished from the surface friction between relatively movable parts) is employed for the purpose of absorbing and dampening the torsional vibrations.

The invention has for its general objects to provide a simple and inexpensive but efficient damper of this type, the parts of which can be easily manufactured and assembled, which, after assembly and installation, requires no subsequent servicing, and in which the inertia member is held accurately centered with respect to its cooperating hub member with which it is resiliently connected.

These and other objects of the invention, together with means whereby the latter may be carried into effect, will best be understood from the following description of a preferred embodiment thereof illustrated in the accompanying drawing. It will be understood, however, that the particular construction described and shown has been chosen for purposes of exemplification merely, and that the invention, as defined by the claims hereunto appended, may be otherwise embodied without departure from the spirit and scope thereof.

Figure 1:
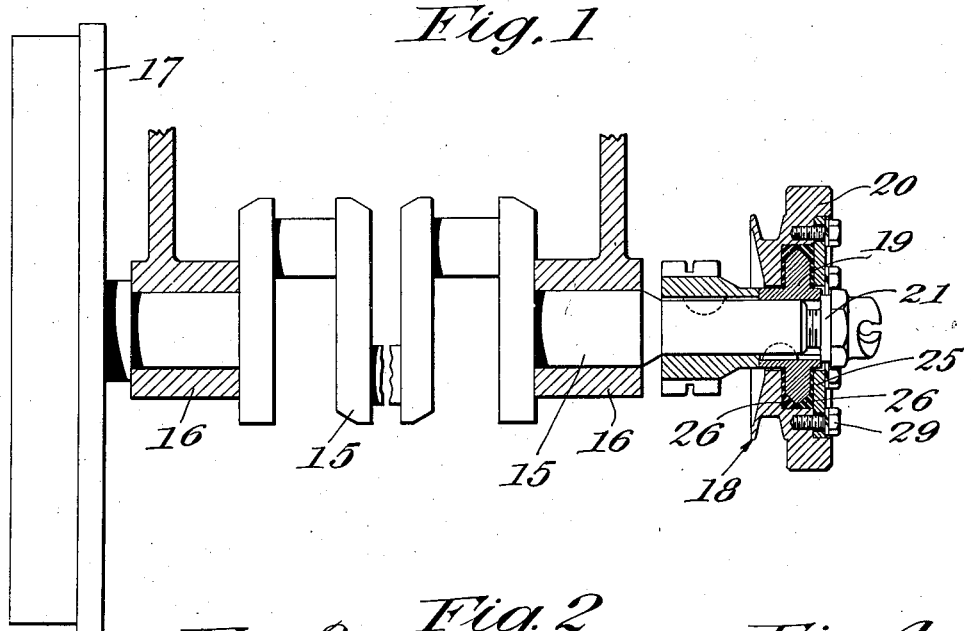
Fig. 1 is an elevation of an engine crankshaft provided with a vibration damper embodying the invention.
Figure 3:
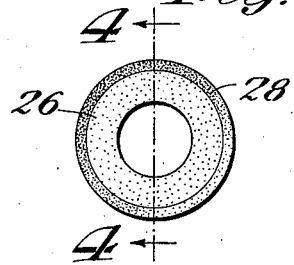
Fig. 3 is a detail elevation of one of the resilient elements or disks.
Figure 2:
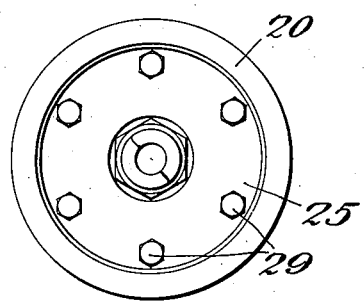
Fig. 2 is an end elevation of the damper.
Figure 4:
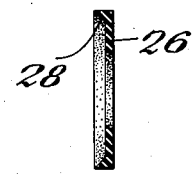
Fig. 4 is a detail section taken substantially on the line 4—4, Fig. 3.

In Fig. 1 is shown an engine crankshaft 15 mounted in bearings 16 and having at one end thereof the usual main flywheel 17 and at the other an auxiliary vibration damping flywheel 18.

The auxiliary flywheel or vibration damper 18 comprises an inner hub member 19 and an outer inertia member 20. The inertia member 20 is rotatable relative to the hub member 19 which is keyed to the shaft 15 and is held in place thereon by a threaded stud 21. One of said members, herein the hub member 19, is provided with an annular flange 23, while the other of said members, herein the inertia member 20, is formed with an annular recess 24 to receive the flange 23, said recess being closed at its outer side by a clamping ring 25, so that the flange 23 is positioned between opposed portions of the inertia member 20 constituted by the bottom of the recess 24 and the clamping ring 25. Interposed between the flange 23 and said opposed portions are two resilient disks 26, preferably of rubber. The free edge of the flange 23, which is spaced from the opposite annular wall 27, of the recess 24 is oppositely bevelled, while each of the rings 26 is formed with a correspondingly bevelled marginal or edge portion 28. The clamping ring 25 is secured to the main body of the inertia member 20 by bolts 29 which are located beyond the peripheral edge of the recess 24, and consequently beyond the edges of the flange 23 and disks 26, so as not to pass through said flange and disks.

Figure 5:
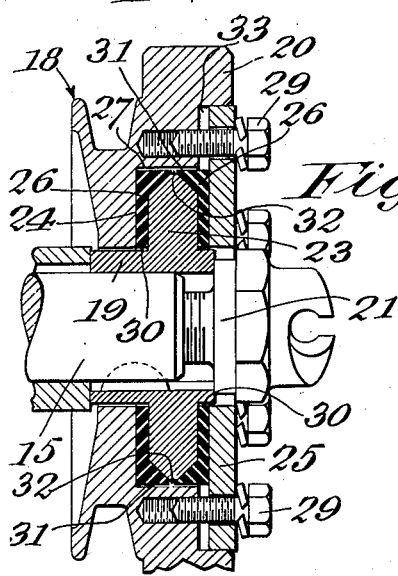
Fig. 5 is an enlarged detail axial section of the damper, illustrating the mode of assembly.
Figure 6:
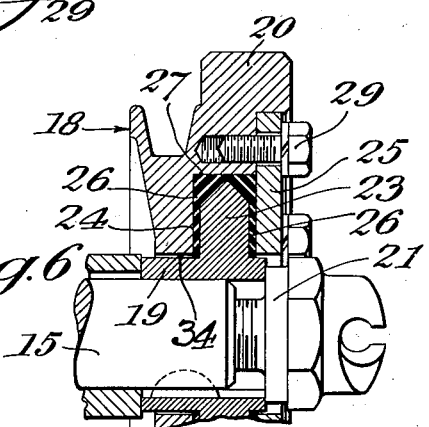
Fig. 6 is a similar view, partly broken away, of the completely assembled damper.

The disks 26 are of such form and size that when the parts are initially assembled as shown in Fig. 5 they do not completely fill the recess 24, but on the contrary leave clearance spaces 30, 31 and 32 between their inner edges and the hub 19, between their outer edges and the wall 27, and between their opposed marginal portions 28. When, however, the bolts 29 are tightened to draw the clamping ring 25 tightly into the countersunk recess 33 provided in the face of the inertia member 20 to receive it, the consequent compression of the disks 26 causes the material thereof to flow into and fill the clearance spaces 30, 31 and 32 as shown in Fig. 6. The degree of compression exerted by the clamping ring 25 upon the disks 26 is sufficient to hold said disks against any relative surface sliding movement with respect to the parts between which they are interposed, so that the dampening action is wholly due to the internal resilience of the rubber or equivalent material of which said disks are composed.

It will be seen that, by virtue of the construction above described, it is unnecessary to form the disks 26 to accurate dimensions and clearances, since the compression thereof during assembly causes them to fit accurately the spaces which they are intended to fill. It will also be seen that when the parts are finally assembled as shown in Fig. 6 no subsequent adjustment or servicing thereof is required, and that consequently the damper, after being installed, demands no further attention. It will further be seen that the construction described provides for the accurate centering of the inertia member 20 with respect to the axis of the hub 19 and shaft 15, and the maintenance of such centered relation, without requiring a direct bearing of the inertia member on the hub 19, a clearance 34 being preferably provided between these parts to permit the centering of said member by the compression of the disks. It will furthermore be seen that, inasmuch as there is no direct connection between the inner and outer members of the damper except such as is afforded by the clamping pressure upon the resilient disks, the resilience of said disks in absorbing the torsional vibrations is available throughout their circumference and radial width.

I claim:

1. A vibration damping flywheel comprising an inner hub member and an outer inertia member, one of said members having an annular flange and the other of said members having opposed portions between which said flange is positioned and an annular portion disposed opposite to but spaced from the free edge of said flange, resilient discs interposed between said flange and both of said opposed portions, and means for clamping said opposed portions together upon said flange and discs with sufficient pressure to compress the latter, the free edge of said flange being oppositely bevelled, and said discs having correspondingly bevelled edge portions engaging therewith.

2. A vibration damping flywheel comprising an inner hub member having an annular flange, an outer inertia member having an annular recess in which said flange is received, a clamping ring for closing the open side of the recess, bolts located beyond said recess for securing said ring to said inertia member, and resilient discs interposed between said flange and the bottom and side of said recess and said ring respectively, the free edge of said flange being oppositely bevelled, and said discs having correspondingly bevelled edge portions engaging therewith.

RALPH H. WHISLER.